United States Patent [19]

Bruff et al.

[11] Patent Number: 4,612,151

[45] Date of Patent: Sep. 16, 1986

[54] METHOD FOR CONTINUOUS PRODUCTION OF ELONGATED CARBON BODIES

[75] Inventors: William V. H. Bruff; Leif Olsen, both of Vågsbygd, Norway

[73] Assignee: Elkem a/s, Oslo, Norway

[21] Appl. No.: 668,492

[22] Filed: Nov. 5, 1984

[30] Foreign Application Priority Data

Dec. 2, 1983 [NO] Norway .................................. 834453

[51] Int. Cl.⁴ ........................ C04B 35/00; H05B 7/094
[52] U.S. Cl. ..................................... 264/105; 29/825; 264/29.5; 264/82; 373/89; 373/97
[58] Field of Search ........................ 264/29.5, 82, 105; 29/825; 373/89, 97

[56] References Cited

U.S. PATENT DOCUMENTS

| | | | |
|---|---|---|---|
| 1,751,177 | 3/1930 | Sem et al. | 373/89 |
| 4,122,294 | 10/1978 | Frolov | 373/89 |
| 4,427,329 | 7/1985 | Bruff et al. | 29/825 |
| 4,536,359 | 8/1985 | Tanaka | 264/105 |

Primary Examiner—George Yeung
Attorney, Agent, or Firm—Lucas & Just

[57] ABSTRACT

The present invention relates to a method for continuous production of elongated carbon bodies having substantial uniform cross-section where a casing filled with unbaked carbonaceous electrode paste is slowly and substantially continuously lowered down through a baking furnace having an external energy supply. The casing is perforated in order to allow baking gases to flow from the electrode paste and into the baking furnace. Air for combustion of the baking gases is supplied to the baking furnace in an amount necessary for combustion of the baking gases which flow into the baking furnace. The external energy supplied to the baking furnace is controlled in such a way that the total amount of external energy supplied to the baking furnace and the energy generated by combustion of the baking gases inside the baking furnace is sufficient to maintain a temperature inside the baking furnace of 700°–1300° C., preferably 900°–1100° C.

16 Claims, 1 Drawing Figure

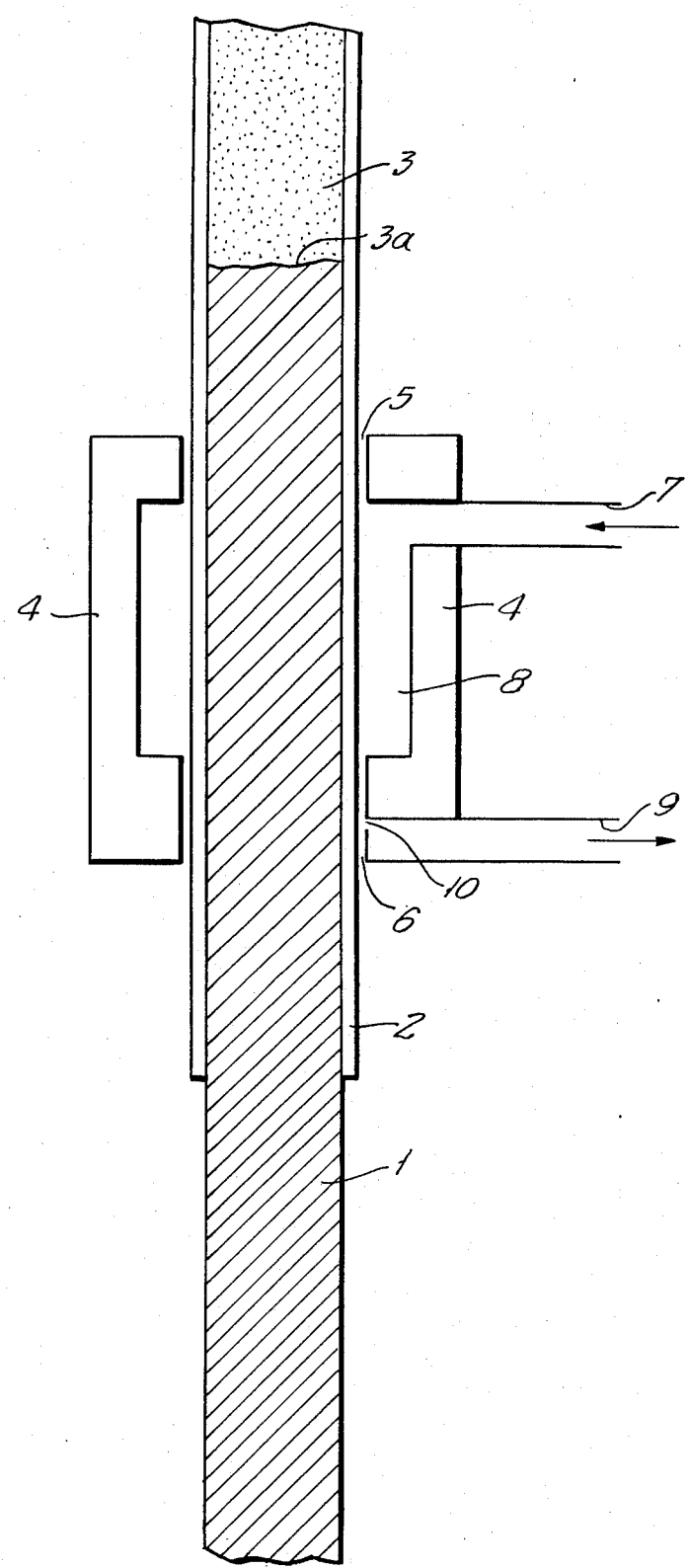

METHOD FOR CONTINUOUS PRODUCTION OF ELONGATED CARBON BODIES

The present invention relates to a method for continuous production of elongated carbon bodies. The method is especially useful for producing carbon electrodes for electrothermic smelting furnaces, but can also be used for production of other elongated carbon bodies such as for example lining blocks and cathode elements in electrolytic cells for production of aluminum. The method according to the present invention can be used in direct connection to electrothermic smelting furnaces in the sense that electrodes can be produced above the furnace and be lowered in a continuous process down into the furnace. On the other side separate pieces of prebaked electrodes can be produced outside the furnaces and can later be mounted on the electrode columns in electrothermic smelting furnaces.

Continuous production of carbon electrodes directly in the furnace is known from Norwegian patent application No. 793220 (now Pat. No. 149.451). According to Norwegian patent application No. 793220 an electrode is produced by supplying heat energy to unbaked electrode paste in an area above the electrode holder where electric operating current is conducted to the electrode. The electrode paste is either charged into a steel casing having no internal ribs and which follows the electrode down through the baking zone or to a permanent casing through which the electrode slips. The method according to Norwegian patent application No. 793220 however, suffers from a number of disadvantages and drawbacks. It is very difficult to produce an electrode having sufficient smooth surface. When baking the electrode, gases evolve from the electrode paste which results in bigger or smaller cavities or holes between the surface of the electrode and the casing. In addition a layer of soot is deposited between the casing and the electrode surface which further impair the quality of the electrode surface. These surface defects on the electrode make it difficult to achieve a good electrical contact between contact clamps and the surface of the electrode when electric operating current is to be conducted to the electrode when used in the smelting furnace. There exist a risk of arcing between the surface of the electrode and the contact clamps. Such arcing is detrimental for the contact clamps. Changing of contact clamps implies long downtime of the furnace and thereby loss of production.

At last, the energy consumption for the method disclosed in Norwegian patent application No. 793220 is high. The total energy which is necessary for baking of the electrode have to be supplied to the baking furnace from an external source.

In accordance with the present invention there is provided a method for continuous production of elongated carbon bodies where the disadvantages and drawbacks of the previously known method have been overcome.

Accordingly the present invention relates to a method for continuous production of elongated carbon bodies with substantially uniform cross-section where a casing filled with unbaked carbonaceous electrode paste is slowly and continuously or substantially continuously lowered down through a baking furnace having an external energy supply, said casing being perforated to allow gases which evolve when the electrode paste is heated to flow through the performations in the casing and into the baking furnace. Air is supplied to the baking furnace in an amount sufficient for combustion of the gases from the electrode paste and the external energy supplied to the baking furnace is regulated in order to maintain a temperature in the baking furnace of 700° to 1300° C., preferably 900°–1100° C. Further embodiments of the present invention will be evident from the following description and the claims.

The method according to the present invention will now be further described in connection with FIG. 1 which in principle shows an apparatus for continuous production of elongated carbon blocks from unbaked electrode paste.

On FIG. 1 is schematically shown a baking furnace 4 to which external energy can be supplied by means of electric resistance heating, induction heating, gas-burners or oil-burners, etc.

Into an electrode casing 2 which is of the same inner cross-section as the outer cross-section of the elongated carbon body 1 which is to be produced, unbaked electrode paste is supplied in an area above the baking furnace 4. The reference numeral 3a indicates the boundary between unbaked electrode paste and the baked carbon body. The carbon body 1 and the casing 2 can be freely moved through the furnace 4 as there is clearance both on the top and the bottom of the baking furnace. The clearance is shown by reference numerals 5 and 6. Combustion air is supplied at 7 and the combustion of the gases which flows out from the perforations in the casing takes place in the chamber 8 which is restricted by the electrode casing 2 and the baking furnace 4. Combustion gases is sucked away from the chamber 8 via a slot 10 and a gas outlet channel 9. In the baking furnace 4 the unbaked electrode paste is baked into a hard carbon body while the temperature is maintained between 700° and 1300° C. As the raw electrode paste is baked, the casing containing the electrode paste is lowered through the baking furnace continuously or substantially continuously. As the casing is lowered down through the baking furnace new sections of the casing are welded on the top of the casing and unbaked electrode paste is filled into the new sections of the casing.

When the electrode paste is heated inside the baking furnace combustible gases are evolved in the electrode paste. When the casing is lowered down through the baking furnace at a substantially constant rate the evolution of gases will also be substantially constant.

According to one preferred embodiment of the present invention a perforated casing is used. The gases which evolves when heating the electrode paste will thereby flow through the perforations in the casing and into the baking furnace at substantially the same rate as the gases evolve. Thereby trapping of gas between the casing and the baked carbon body is prevented. This results in a very smooth, clean surface of the baked carbon body as gas-pockets and carbon layers on the surface of the carbon body are prevented. If the carbon body is to be used as an electrode in an electrothermal smelting furnace it is essential that the surface of the electrode is very smooth. An uneven surface will lead to poor electrical contact between the electrode and the contact clamps and hence there will be a certain risk of arcing. Arcing is as mentioned above, detrimental to the contact clamps.

According to another preferred embodiment of the present invention the gases which flow into the baking furnace are utilized to generate at least a part of the energy which is necessary to maintain the temperature in the baking furnace at the desired level. Combustion air is supplied to the baking furnace in an amount which is necessary for complete combustion of the baking gases. The amount of energy which have to be supplied to the baking furnace from an external supply will thereby be much smaller than what is necessary according to the known methods. If the baking speed is high enough, it is even possible to supply all of the energy necessary for baking of the carbon body by combustion of the baking gases.

Preferably a casing is used which has a degree of perforation of less than 25%. A degree of perforation between 0.1–5% is specially preferred. By degree of perforation is herein understood the total area of holes in the casing given as percent of the total area of the casing.

In order to prevent point oxidation of the carbon body within the baking furnace and too much leakage of electrode paste the individual perforations or holes in the casing have preferably a diameter of between 0.5 and 10 mm. A diameter between 2 and 4 mm is specially preferred. The holes in the casing can be of any geometrical form, e.g. circular, quadratic, rectangular or the like.

According to one embodiment of the present invention the holes in the casing are initially covered by a material which melts or burns away at a temperature between 250° and 900° C. This can be done either by closing each individual hole or by providing a material such as for example a thin foil on the inside of the casing. It is also possible to press, drift or drill recesses in the casing, where the remaining material in the recesses is not thick enough to withstand the heat in the baking furnace. The holes will then first open up when they have advanced into the baking furnace. Thereby any leakage of unbaked electrode paste or binder will be prevented. Further the baking gases which evolves near the top of the baking furnace will be pressed downwards before they can flow out through the openings in the casing. This improves the quality of the carbon body as the density and strength of the carbon body becomes higher because the evolved gases will be cracked at the high temperature and produce carbon which will fill any pores in the carbon body.

The carbon body produced according to the present invention can be used directly in an electrothermic smelting furnace situated below the baking furnace or the elongated body can be cut into suitable lengths to produce other types of elongated carbon products. If the elongated carbon body is used as an electrode in a furnace situated below the baking furnace, the casing can be removed beneath the baking furnace where the carbon body is fully baked. Hence the carbon body produced according to the present invention can be used as a continuous electrode in furnaces for smelting of metals or alloys where the casing material, e.g. steel would contaminate the product.

We claim:

1. A method for continuous production of elongated carbon bodies having a substantially uniform cross-section wherein a casing filled with unbaked carbonaceous electrode paste and a binder is slowly and continuously or substantially continuously lowered down through a baking furnace having an external energy supply, said method comprising:

providing a perforated casing;

filling said perforated casing with unbaked carbonaceous electrode paste and a binder;

heating said electrode paste thereby causing baking gases to evolve from the electrode paste and flow through the perforations in the casing into the baking furnace;

supplying air to the baking furnace in an amount sufficient for combustion of the baking gases which flow into the baking furnace from the electrode paste; and adjusting the external supply of energy to the baking furnace in such a way that the total amount of external supplied energy and energy generated by combustion of the baking gases is sufficient to maintain a temperature in the baking furnace between 700° and 1300° C.

2. Method according to claim 1, wherein the temperature in the baking furnace is maintained between 900° and 1100° C.

3. Method according to claim 1, wherein the casing has a degree of perforation of less than 25%.

4. Method according to claim 1, wherein the casing has a degree of perforation between 0.1 and 5%.

5. Method according to claim 1, wherein the individual holes or perforations in the casing have diameters between 1.5 and 10 mm.

6. Method according to claim 1, wherein the individual holes or perforations in the casing have diameters between 2.0 and 4 mm.

7. Method according to claim 1 wherein the holes or perforations in the casing are initially covered with a material which prevents the electrode paste or binder from leaking out and said material melts or burns away at a temperature between 250° and 900° C. such that the holes or perforations which are no longer covered by said material allow baking gases to flow into the baking furnace.

8. Method according to claim 1 wherein recesses are made in the casing at points where the perforations are to be, said recesses melting through the casing when exposed to the temperature in the baking furnace thereby opening said perforations and allowing baking gases to flow into the baking furnace.

9. Method according to claim 1, wherein the casing is removed from the baked elongated carbon body below the baking furnace.

10. Method according to claim 2, wherein the casing has a degree of perforation of less than 25%.

11. Method according to claim 3 wherein the casing has a degree of perforation between 0.1 and 5%.

12. Method according to claim 10 wherein the casing has a degree of perforation between 0.1 and 5%.

13. Method according to claim 12 wherein the individual holes or perforations in the basing have diameters between 1.5 and 10 mm.

14. Method according to claim 11 wherein the individual holes or perforations in the casing have diameters between 1.5 and 10 mm.

15. Method according to claim 13 wherein the individual holes or perforations in the casing have diameters between 2.0 and 4 mm.

16. Method according to claim 14 wherein the individual holes or perforations in the casing have diameters between 2.0 and 4 mm.

* * * * *